(12) United States Patent
Kihara et al.

(10) Patent No.: US 6,702,962 B2
(45) Date of Patent: Mar. 9, 2004

(54) MANUFACTURING METHOD OF FERRULE FOR MULTI OPTICAL CONNECTOR

(75) Inventors: Yasushi Kihara, Tokyo (JP); Katsuki Suematsu, Tokyo (JP); Masao Shinoda, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 245 days.

(21) Appl. No.: 09/910,465

(22) Filed: Jul. 20, 2001

(65) Prior Publication Data

US 2002/0149126 A1 Oct. 17, 2002

(30) Foreign Application Priority Data

Apr. 12, 2001 (JP) .......................................... 2001-114560

(51) Int. Cl.[7] .............................................. B29D 11/00
(52) U.S. Cl. ...................................... 264/1.25; 264/334
(58) Field of Search ................................. 264/1.25, 1.1, 264/334

(56) References Cited

FOREIGN PATENT DOCUMENTS

JP            3-45912     *    2/1991

* cited by examiner

Primary Examiner—Mathieu D. Vargot
(74) Attorney, Agent, or Firm—Oblon, Spivak, McClelland, Maier & Neustadt, P.C.

(57) ABSTRACT

A ferrule for a multi optical connector is formed by filling a cavity in a mold with melted resin and the ferrule is pushed out of the cavity by pressing a face on the side in which an adhesive pouring port is formed of the formed ferrule. Two positions on both outer sides with respect to a center line in the arrangement direction of the fiber or three or more positions including those two positions, near a joint end face on a face on the side in which the adhesive pouring port is formed, are pressed.

4 Claims, 6 Drawing Sheets

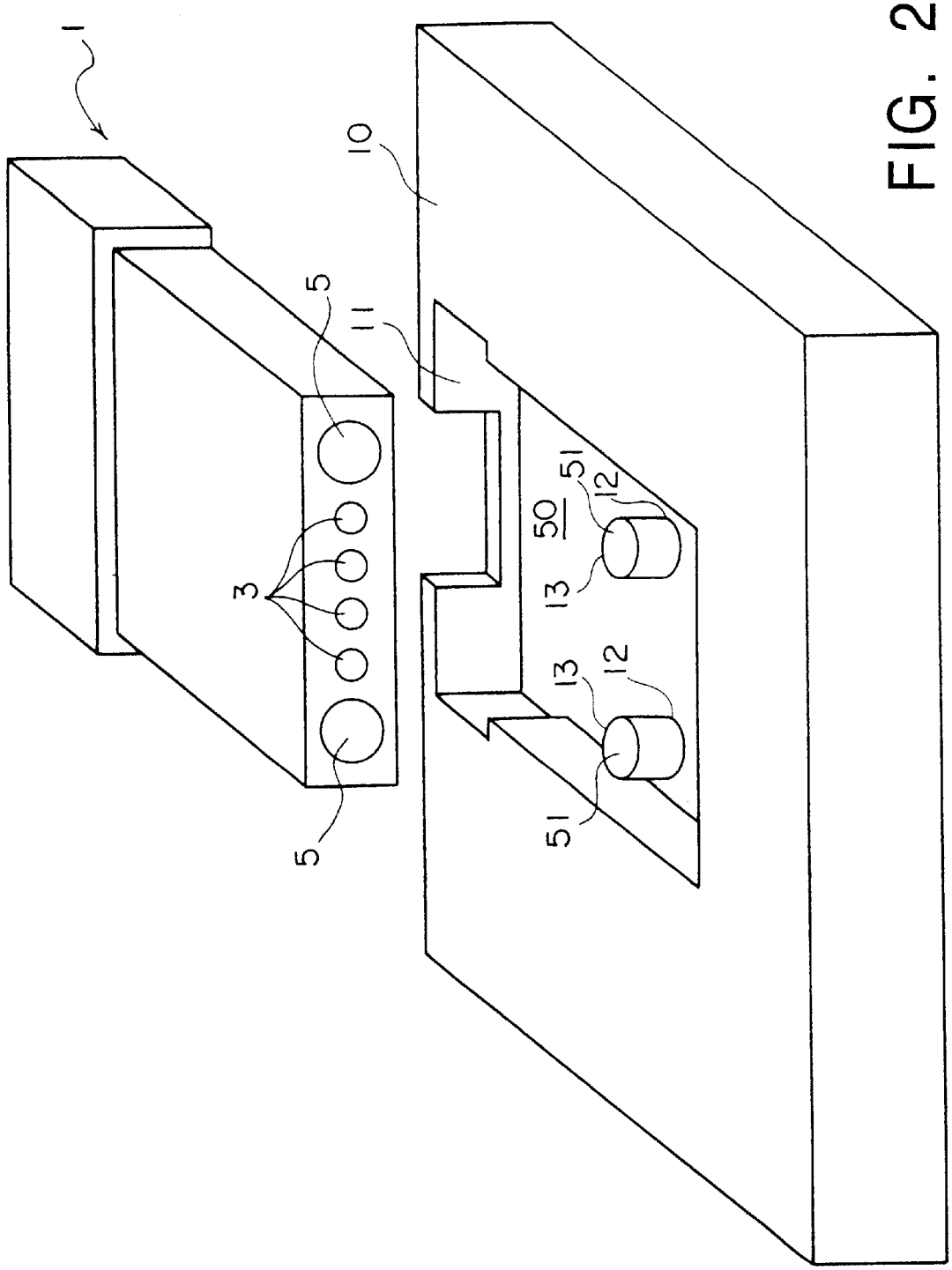

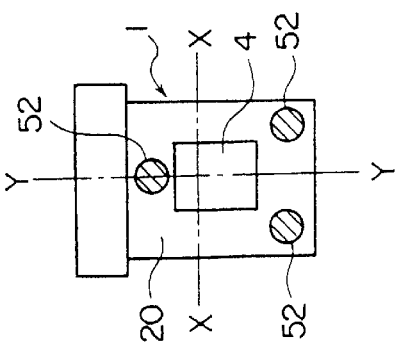
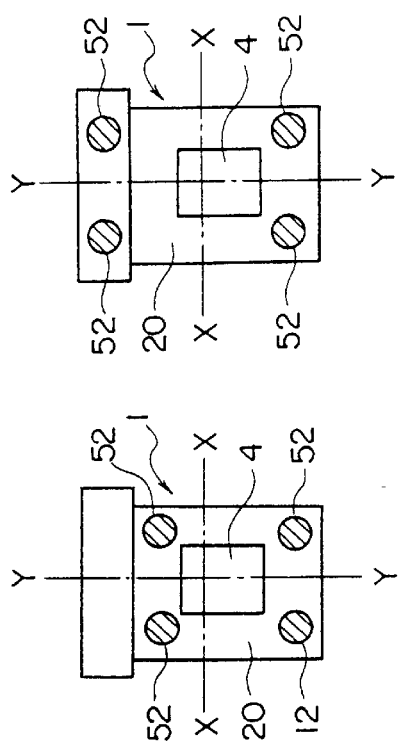
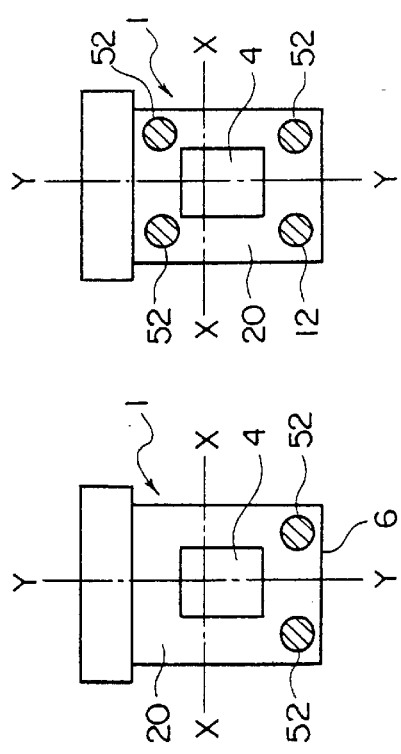
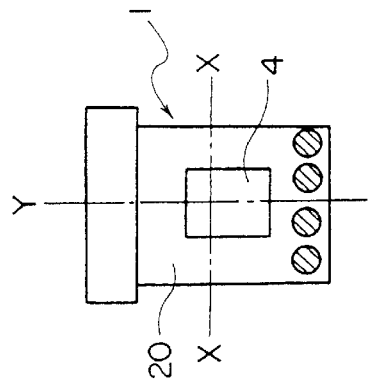
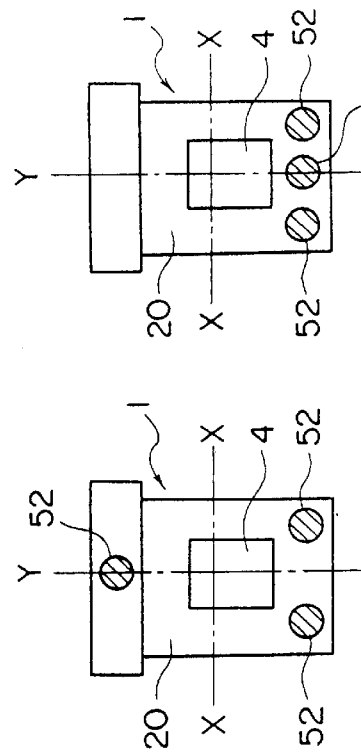
FIG. 4A  FIG. 4B  FIG. 4C  FIG. 4D  FIG. 4E  FIG. 4F  FIG. 4G

MANUFACTURING METHOD OF FERRULE FOR MULTI OPTICAL CONNECTOR

BACKGROUND OF THE INVENTION

The present invention relates to a manufacturing method of the ferrule for the multi optical connector.

Conventionally, ferrules for the multi optical connector (hereinafter referred to as "ferrule") of various types and intended for various purposes are available. Those ferrules are manufactured by filling a cavity in a mold comprised of an upper mold and a lower mold with melted resin.

SUMMARY OF THE INVENTION

According to a manufacturing method of the present invention, there is provided a manufacturing method of the ferrule for the multi optical connector wherein an insertion opening allowing the multi optical fiber to be inserted is formed in a face thereof while a plurality of fiber holes allowing each of optical fibers composing the multi optical fiber inserted through the insertion opening are disposed forward of the insertion opening, and the respective fiber holes pass through up to a joint end face formed on an opposite side to the insertion opening plane in which the insertion opening is formed and an adhesive pouring port is formed in other face than the insertion opening plane and the joint end face, the ferrule for the multi optical connector having the above-described structure being formed by filling a cavity in a mold with melted resin, the ferrule being pushed out of the cavity by pressing a face on the side in which the adhesive pouring port is formed, of the formed ferrule for the multi optical connector.

According to another manufacturing method of the present invention, there is provided a manufacturing method of a ferrule for a multi optical connector wherein an insertion opening allowing the multi optical fiber to be inserted is formed in a face thereof while a plurality of fiber holes allowing each of optical fibers composing the multi optical fiber inserted through the insertion opening are disposed forward of the insertion opening, and the respective fiber holes pass through up to a joint end face formed on an opposite side to the insertion opening plane in which the insertion opening is formed and an adhesive pouring port is formed in other face than the insertion opening plane and the joint end face, the ferrule for the multi optical connector having the above-described structure being formed by filling a cavity in a mold with melted resin, the ferrule being pushed out of the cavity by pressing two positions on both outer sides with respect to a center line in the arrangement direction of the fiber holes near the joint end face, on a face on the side in which the adhesive pouring port is formed, of the formed ferrule for the multi optical connector.

According to still another method of the present invention, there is provided a manufacturing method of a ferrule for a multi optical connector wherein an insertion opening allowing the multi optical fiber to be inserted is formed in a face thereof while a plurality of fiber holes allowing each of optical fibers composing the multi optical fiber inserted through the insertion opening are disposed forward of the insertion opening, and the respective fiber holes pass through up to a joint end face formed on an opposite side to the insertion opening plane in which the insertion opening is formed and an adhesive pouring port is formed in other face than the insertion opening plane and the joint end face, the ferrule for the multi optical connector having the above-described structure being formed by filling a cavity in a mold with melted resin, the ferrule being pushed out of the cavity by pressing three or more positions including two positions on both outer sides with respect to a center line in the arrangement direction of the fiber holes near the joint end face, on a face on the side in which the adhesive pouring port is formed, of the formed ferrule for the multi optical connector.

BRIEF DESCRIPTION OF THE DRAWINGS

FIG. 2 is an explanatory diagram showing an example of a lower mold for use in the manufacturing method of the present invention;

FIGS. 4A to 4G are explanatory diagrams showing an example in which the setting position of an ejector is different;

DETAILED DESCRIPTION OF THE PREFERRED EMBODIMENT

An embodiment of the manufacturing method of the ferrule according to the present invention will be described. According to the manufacturing method, the ferrule 1 shown in FIG. 1 is manufactured by filling a cavity in the mold comprised of a upper mold and a lower mold with melted resin.

Figure 1:
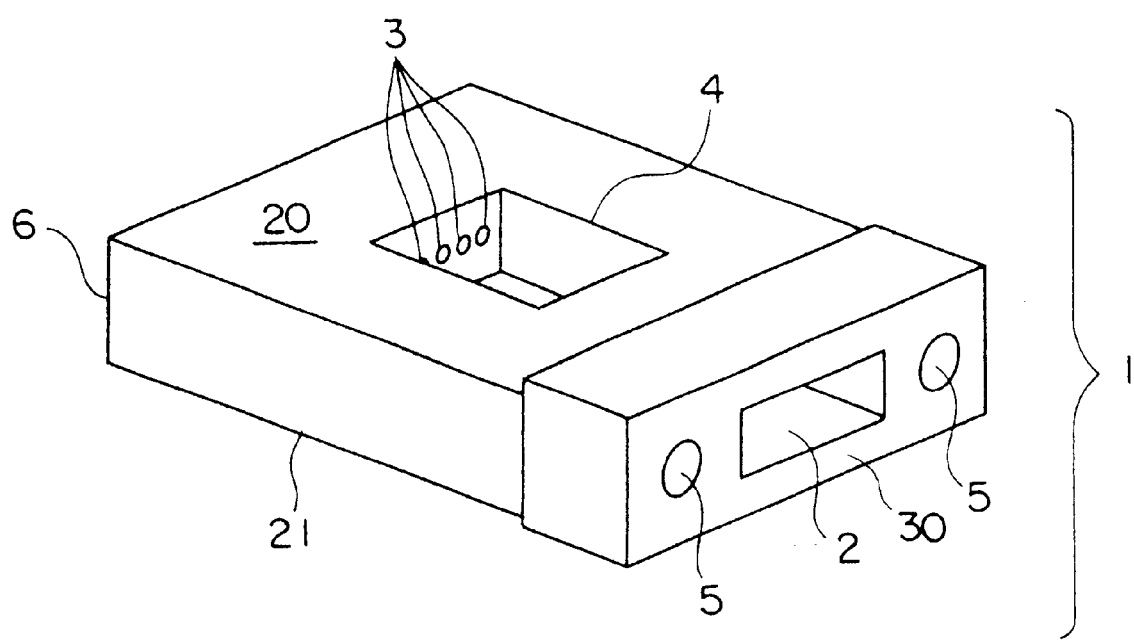
FIG. 1 is a perspective view showing an example of the ferrule manufactured according to a manufacturing method of the present invention.

The ferrule 1 shown in FIG. 1 includes an insertion opening 2, a fiber hole 3, an adhesive pouring port 4 and a guide pin hole 5. The aforementioned insertion opening 2 is formed in one end face in the length direction of the ferrule 1. This insertion opening 2 allows a multi optical fiber to be inserted into the inside of the ferrule 1. A plurality of the aforementioned fiber holes 3 are arranged in an end face of the insertion opening 2 (disposed in parallel). These fiber holes 3 allow respective optical fibers, which are exposed at an end of the multi optical fiber, to be inserted through the insertion opening 2 separately. The optical fiber inserted through the fiber hole 3 may be an independent optical fiber, but not each of individual optical fibers composing the multi optical fiber. The optical fiber inserted through the fiber hole 3 is exposed out of the joint end face 6 on an opposite side to an insertion opening plane 30 in which the insertion opening 2 is formed. The aforementioned adhesive pouring port 4 is formed between the insertion opening 2 and the fiber hole 3. Adhesive for fixing the optical fiber inserted through the fiber hole 3 to the ferrule 1 is poured into the adhesive pouring port 4. The guide pin holes 5 are formed on both sides of the insertion opening 2 such that they pass through from the insertion opening plane 30 to the joint end face 6.

In case of manufacturing the ferrule shown in FIG. 1 according to the manufacturing method of the present invention, a mold comprised of the lower mold 10 shown in FIG. 2 and an upper mold (not shown) is employed. In the lower mold 10 shown in FIG. 2, two cylindrical pin disposal holes 12, which communicate with outside, are provided in a bottom face 50 of the cavity 11 and eject pins 13 of 0.8 to 1.0 mm in diameter are inserted into each of pin disposal holes 12. Although representation of the upper mold is omitted, the upper mold has the same cavity as the cavity in the aforementioned lower mold. By matching that cavity with the cavity 11 in the lower mold, a cavity capable of molding the ferrule 1 shown in FIG. 1 is formed between both the molds.

Hereinafter, the process for manufacturing the ferrule 1 shown in FIG. 1 according to the manufacturing method of the present invention will be described.

Figure 3B:
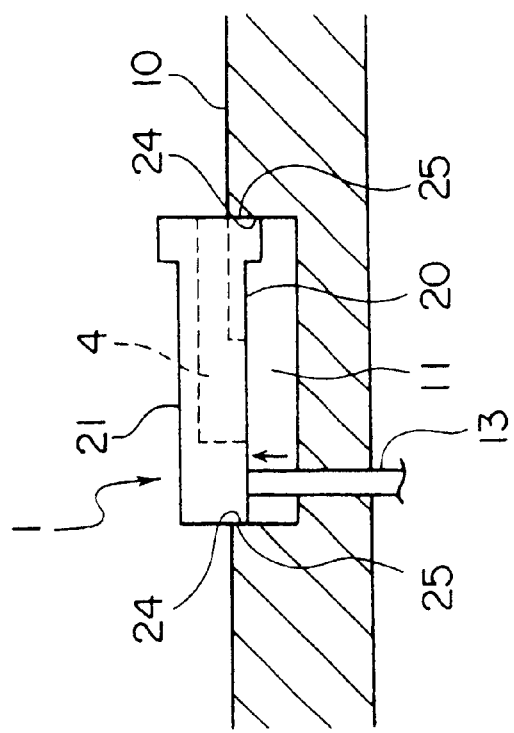
FIG. 3A is a lateral sectional view showing a process of pressing out a molded ferrule from a cavity of the lower mold according to the manufacturing method of the present invention and FIG. 3B is a longitudinal sectional view thereof.
Figure 3A:
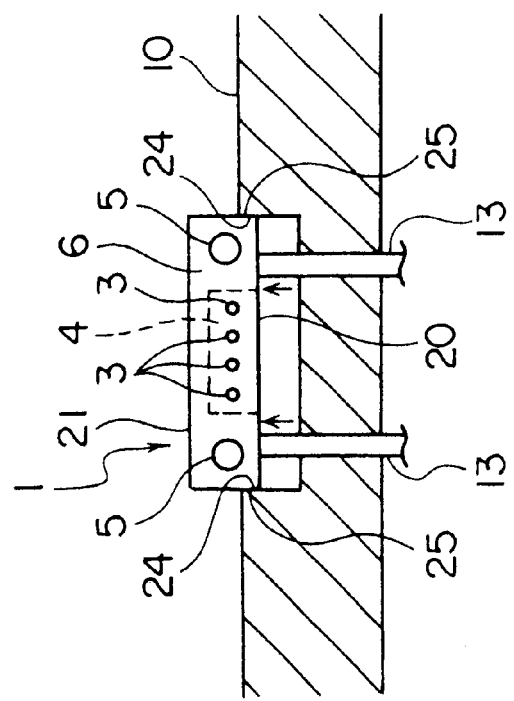

(1) Necessary members, such as forming pins for forming the fiber holes 3 and the guide pin holes 5 shown in FIG. 1 and core for forming the insertion opening 2 and the adhesive pouring port 4, are disposed within the cavity 11 in the lower mold 10 shown in FIG. 2.
(2) By matching the cavity in the upper mold (not shown) with the cavity 11 in the lower mold 10, a cavity is formed between both the molds. Part of the necessary members such as the forming pins and the core may be disposed within the cavity in the upper mold.
(3) Melted resin is poured through a resin pouring port provided in the upper mold or the lower mold 10 into the formed cavity.
(4) After resin is hardened, the upper mold is opened.
(5) As shown in FIGS. 3A, 3B, the aforementioned eject pins 13 are raised, so that end faces 51 (FIG. 2) thereof are pressed against the ejector portions 52 (FIG. 4A) set up on a peripheral face of the opposing ferrule 1.
(6) By raising the eject pin 13 further upward, the molded ferrule 1 is pushed out of the cavity 11 in the lower mold 10.

As shown in FIG. 4A, the ejector portions 52 are provided at two positions in a pouring face 20 containing the adhesive pouring port 4 formed in the peripheral face of the ferrule 1. More specifically, the ejector portions 52 are disposed near the joint end face 6 with respect to a center line X—X in the length direction of the fiber holes on the pouring face 20 such that they are symmetrical with respect to a center line Y—Y in the arrangement direction of the fiber holes.

If the ejector portions 52 are provided at the two positions shown in FIG. 4A, other ejector portions may be provided at other positions. For example, it is permissible to dispose the ejector portions 52 at positions shown in FIGS. 4B to 4G. FIG. 4B shows a case where in addition to the two positions shown in FIG. 4A, the other ejector portions 52 are disposed at two positions near the insertion opening 2 with respect to the center line X—X in the length direction of the fiber holes such that they are symmetrical with respect to the center line Y—Y in the arrangement direction of the fiber holes. FIG. 4C shows a case where in addition to the two positions shown in FIG. 4A, the other ejector portions 52 are provided at the other two positions symmetrical to the aforementioned two positions with respect to the center line X—X in the length direction of the fiber holes. FIGS. 4D, 4E show cases where in addition to the two positions shown in FIG. 4A, another ejector portion is disposed at a position near the insertion opening 2 with respect to the center line X—X in the length direction of the fiber holes such that it is located on the center line Y—Y in the arrangement direction of the fiber holes. FIG. 4F shows a case where another ejector portion 52 is disposed between the two positions shown in FIG. 4A such that it is located at a position on the center line Y—Y in the arrangement direction of the fiber holes. FIG. 4G shows a case where the other ejector portions 52 are disposed between the two positions shown in FIG. 4A such that they are symmetrical to each other with respect to the center line Y—Y in the arrangement direction of the fiber holes.

If the ejector portions 52 are set up at the positions shown in FIGS. 4B to 4G, a mold having the eject pins 13 (FIG. 2) for pressing those ejector portions 52 and the pin disposal holes 12 (FIG. 2) for disposing the eject pins 13 is employed. The setting positions of the ejector portions 52 are not restricted to the positions shown in FIGS. 4B to 4G.

The pin disposal holes 12 and the eject pins 13 may be provided in the upper mold. In this case also, the ejector portions 52 are set up on the pouring face 20 of the ferrule 1.

The ferrule, which can be manufactured according to the manufacturing method of the ferrule of the present invention, is not restricted to the ferrule shown in FIG. 1. That is, all manufacturing methods of the ferrule including a process of pushing out the formed ferrule from the cavity in the mold by pressing an opposite face to the side in which the adhesive pouring port is formed, of an peripheral face of the formed ferrule are included in the manufacturing method of the ferrule of the present invention.

INDUSTRIAL APPLICABILITY

When an optical connector is produced by mounting a ferrule to an end of a multi optical fiber, it is necessary to polish a joint end face of the ferrule after the multi optical fiber is inserted into and fixed in the ferrule. In this case, in order to obtain a more excellent precision of polish, it is desirable to polish with a face having the largest area as a reference plane of the peripheral face of the ferrule. If speaking with the ferrule shown in FIG. 1 as an example, preferably, a plane 21 on an opposite side to the side in which the adhesive pouring port 4 is formed, is used as a reference plane.

However, the manufacturing method in which upon forming the ferrule 1 shown in FIG. 1, the ferrule is pushed out of the cavity in the mold by pressing the eject pins against a face on an opposite side to the side in which the adhesive pouring port 4 is formed has the following problems. Traces of the pin disposal holes 12 and eject pins 13 shown in FIG. 2 are left on the reference plane 21 so that precision of surface worsens. Thus, the precision of polish worsens when polishing the joint end face 6 with reference to the reference plane 21. Worsening of the precision of polish leads to increase of connection failure of the optical connector. Although it can be considered that it is held by selecting portions having no traces of the pin disposal holes 12 and the eject pins 13, the area to be held is short in this case, so that consequently, the precision of polish worsens.

Figure 5:
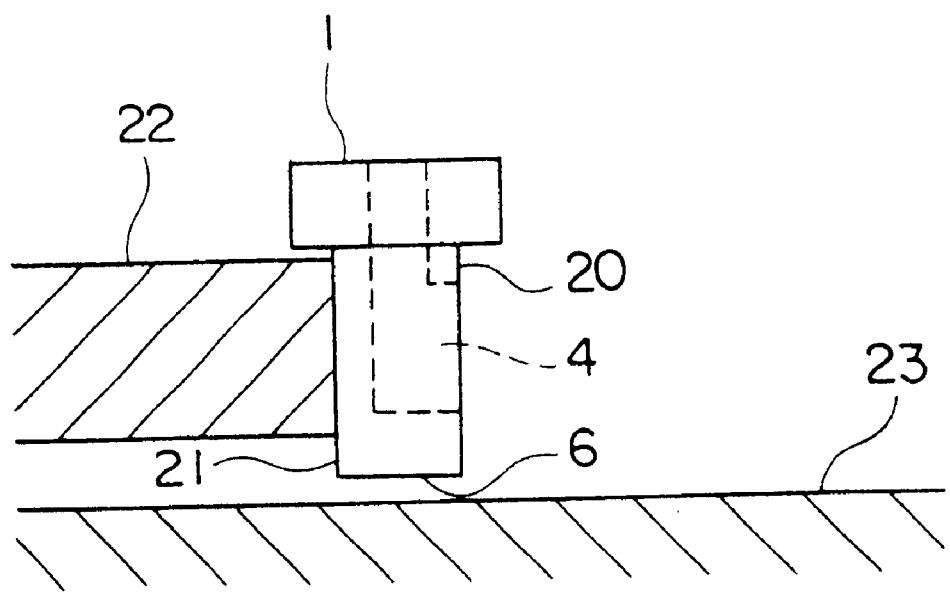
FIG. 5 is an explanatory diagram showing an example of the method of polishing a joint end face of the ferrule.

To the contrary, according to the manufacturing method of the ferrule of the present invention, when forming the ferrule 1 shown in FIG. 1, the ferrule 1 is pushed out of the cavity in the mold by pressing the face on the side in which the adhesive pouring port 4 is formed. Therefore, even if the ferrule is pushed out of the cavity in the mold with the eject pins by pressing the eject pins against the face in which the adhesive pouring port 4 is formed, the above-described problem does not occur. More specifically, the traces of the pin disposal holes 12 and the eject pins 13 shown in FIG. 2 are not left on the reference plane 21, so that the reference plane 21 having a high precision of surface can be obtained. As a result, as shown in FIG. 5, if with the reference plane 21 held by the holding portions 22 of a polishing machine, the joint end face 6 is polished by making it in contact with a rotating grinder 23, an excellent precision of polish can be obtained.

Figure 6B:
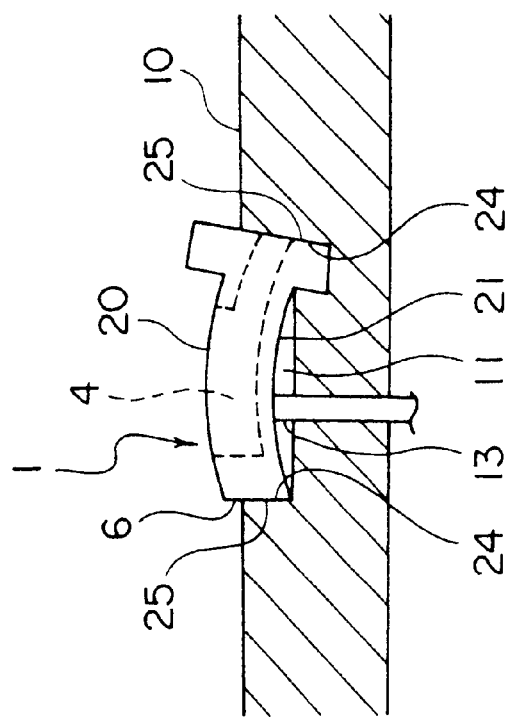
FIG. 6A is a lateral sectional view showing a process for pressing out a molded ferrule from a cavity in the lower mold according to a conventional manufacturing method and FIG. 6B is a longitudinal sectional view thereof.
Figure 6A:
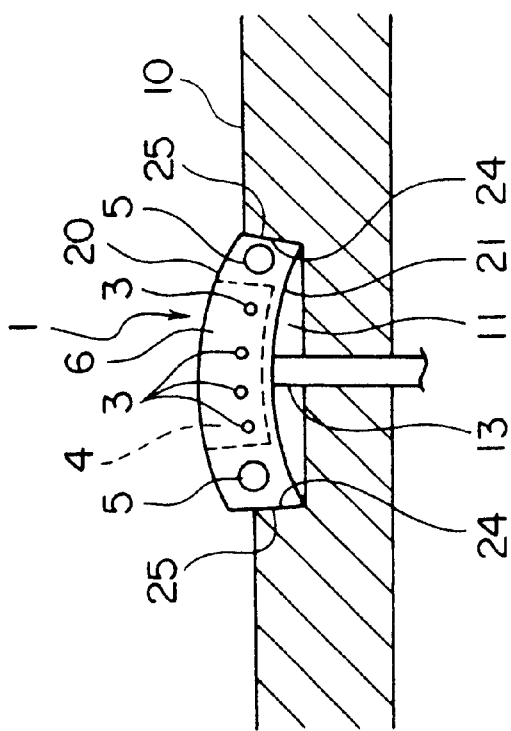

When the ferrule is pushed out of the cavity in the mold, friction resistance is generated between an inside face of the cavity and an outer side face of the ferrule in contact therewith. Particularly, if it is intended to push the ferrule out of the cavity with the eject pins pressed against the peripheral face of the ferrule, the following problem occurs. A bending moment is applied to the ferrule such that a contact point (hereinafter referred to as "pressing point") between the peripheral face of the ferrule and the eject pin serves as a fulcrum point, so that warpage occurs in the ferrule 1. This bending moment is increased as a distance between the pressing point and the outer side face of the ferrule which is in contact with an inside face of the cavity is increased and correspondingly, warpage generated in the ferrule is increased. Particularly, if the eject pin 13 is pressed against a position on the peripheral face of the ferrule 1 as shown in FIGS. 6A, 6B, the distance from the aforementioned pressing point to the outer side face 25 of the ferrule 1 in contact with the inside face of the cavity is increased, so that the warpage is intensified. Further, if the warpage is generated near the joint end face 6 of the ferrule 1, the relation of the positions between the fiber hole 3 and the guide pin hole 5 is confused largely. As a result, even if different ferrules are matched with each other with the guide pins inserted through the guide pin holes, it comes that their fiber holes do not agree with each other.

According to the manufacturing method of the ferrule of the present invention, two positions on both sides with respect to the center line in the arrangement direction of the fiber holes, near the joint end face of a face on the side in which the adhesive pouring port is formed are pressed. Therefore, when the ferrule is pushed out of the cavity with the eject pins pressed against the peripheral face of the formed ferrule, the distance between the pressing point and the outer side face of the ferrule kept in contact with the inside face of the cavity is shorter. If speaking more specifically with reference to FIGS. 3A, 3B, the distance between the pressing point and the outer side face 25 of the ferrule 1 kept in contact with the inside face 24 of the cavity 11 in the lower mold 10 is shorter than the case shown in FIGS. 6A, 6B. Therefore, the aforementioned bending moment is reduced thereby suppressing the warpage generated in the ferrule 1 to a maximum extent. As a result, the relation of the positions between the fiber hole 3 and the guide pin 5 is not confused, so that the above-described problem never occurs. If the aforementioned pressing points are set up at two positions symmetrical with respect to the center line in the arrangement direction of the fiber holes in the ferrule, the aforementioned effect is further intensified.

What is claimed is:

1. A manufacturing method of a ferrule for a multi optical connector wherein an insertion opening allowing the multi optical fiber to be inserted is formed in a face thereof while a plurality of fiber holes allowing each of optical fibers composing the multi optical fiber inserted through the insertion opening to be inserted are disposed forward of the insertion opening, and the respective fiber holes pass through up to a joint end face formed on an opposite side to the insertion opening plane in which the insertion opening is formed and an adhesive pouring port is formed in other face than the insertion opening plane and the joint end face, the ferrule for the multi optical connector having the above-described structure being formed by filling a cavity in a mold with melted resin, the ferrule being pushed out of the cavity by pressing a face on the side in which the adhesive agent pouring port is formed, of the formed ferrule for the multi optical connector.

2. A manufacturing method of a ferrule for a multi optical connector wherein an insertion opening allowing the multi optical fiber to be inserted is formed in a face thereof while a plurality of fiber holes allowing each of optical fibers composing the multi optical fiber inserted through the insertion opening to be inserted are disposed forward of the insertion opening, and the respective fiber holes pass through up to a joint end face formed on an opposite side to the insertion opening plane in which the insertion opening is formed and an adhesive pouring port is formed in other face than the insertion opening plane and the joint end face, the ferrule for the multi optical connector having the above-described structure being formed by filling a cavity in a mold with melted resin, the ferrule being pushed out of the cavity by pressing two positions on both outer sides with respect to a center line in the arrangement direction of the fiber holes near the joint end face, on a face on the side in which the adhesive pouring port is formed, of the formed ferrule for the multi optical connector.

3. A manufacturing method of a ferrule for a multi optical connector wherein an insertion opening allowing the multi optical fiber to be inserted is formed in a face thereof while a plurality of fiber holes allowing each of optical fibers composing the multi optical fiber inserted through the insertion opening to be inserted are disposed forward of the insertion opening, and the respective fiber holes pass through up to a joint end face formed on an opposite side to the insertion opening plane in which the insertion opening is formed and an adhesive pouring port is formed in other face than the insertion opening plane and the joint end face, the ferrule for the multi optical connector having the above-described structure being formed by filling a cavity in a mold with melted resin, the ferrule being pushed out of the cavity by pressing three or more positions including two positions on both outer sides with respect to a center line in the arrangement direction of the fiber holes near the joint end face, on a face on the side in which the adhesive pouring port is formed, of the formed ferrule for the multi optical connector.

4. A manufacturing method of the ferrule for the multi optical connector according to claim 2 or 3 wherein the two positions on both the outer sides with respect to the center line in the arrangement direction of the fiber holes are symmetrical with respect to the center line in the arrangement direction of the fiber holes.

* * * * *